C. E. DREILING.
GRAPPLE.
APPLICATION FILED NOV. 5, 1917.
1,268,822.
Patented June 11, 1918.
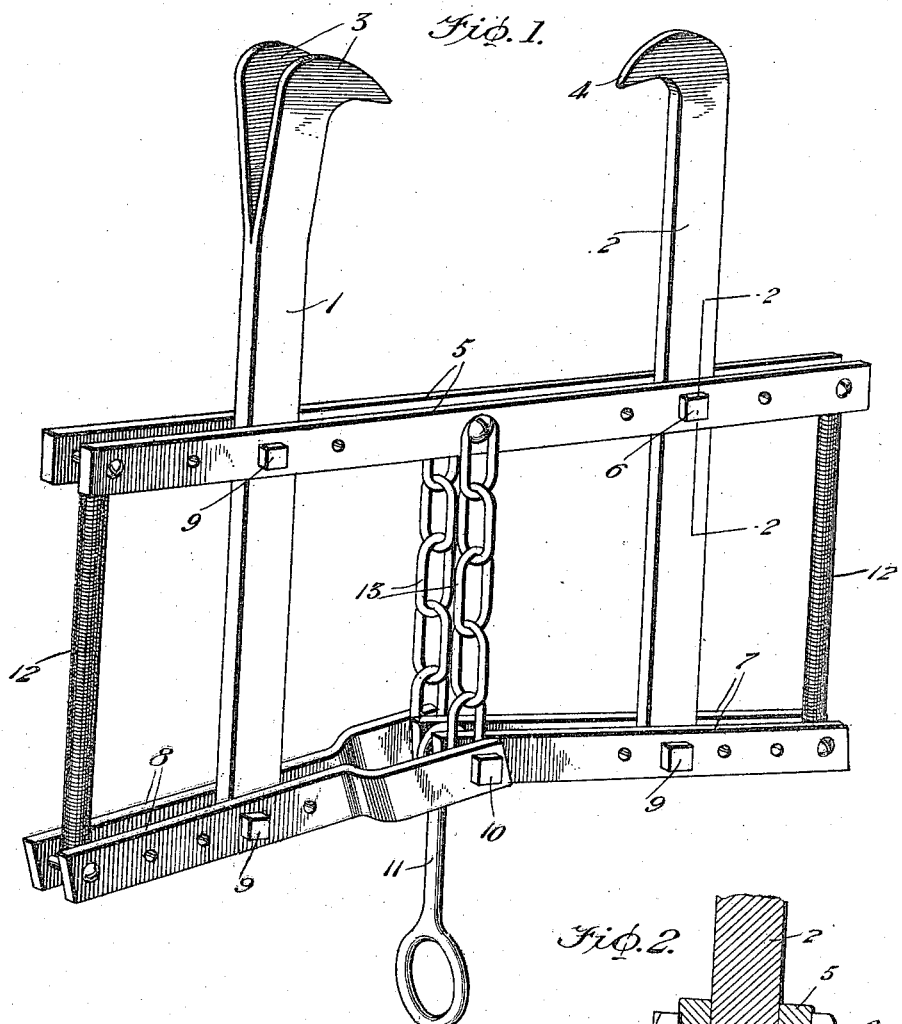
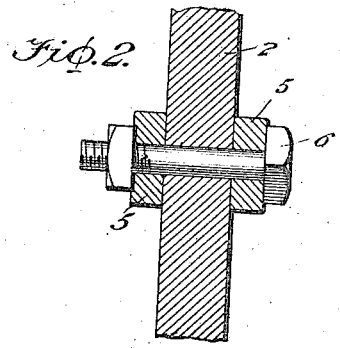
WITNESS
R. E. Rousseau
INVENTOR
C. E. Dreiling,
BY
ATTORNEYS

UNITED STATES PATENT OFFICE.

CHARLES EIRNEST DREILING, OF HENDERSON, KENTUCKY.

GRAPPLE.

1,268,822.  Specification of Letters Patent.  Patented June 11, 1918.

Application filed November 5, 1917. Serial No. 200,328.

*To all whom it may concern:*

Be it known that I, CHARLES E. DREILING, a citizen of the United States, and a resident of Henderson, in the county of Henderson and State of Kentucky, have invented certain new and useful Improvements in Grapples, of which the following is a specification.

My invention is an improvement in grapples, and has for its object to provide a device of the character specified which may be engaged with a fixed object, as, for instance, a beam, joist, log or the like, and clamped thereto, and in which the strain of the pull upon the grapple will tighten the grapple on the fixed object.

In the drawings:

Figure 1 is a perspective view of the improved grapple;

Fig. 2 is a section on the line 2—2 of Fig. 1.

In the present embodiment of the invention, a pair of gripping dogs 1 and 2 is provided, the dog 1 being forked at one end, and the arms of the fork are provided with laterally extending spurs 3. The dog 2 has a single spur 4, and the arrangement is such that the spur 4 will grasp the fixed object between the spurs 3. Each dog is pivoted intermediate its ends between a pair of bars 5, by means of a bolt and nut 6, and the pivotal connection with the bars is made adjustable, a series of registering openings being provided at each end of the pair for receiving the bolt 6.

The end of each dog remote from the spurs 3 and 4 is pivoted between a pair of bars 7 and 8, respectively, by means of bolts and nuts 9, and this pivotal connection is adjustable in the same manner as that in connection with the bars 5, series of registering openings being provided in each pair of bars for receiving the bolts. The adjacent ends of the pairs of bars 7 and 8 are pivotally connected, as indicated at 10, and it will be noticed that the ends of the bars 8 are offset outwardly to engage the outer faces of the bars 7.

A double eye bar 11 has one of its eyes engaged by the bolt 10, the said eye being arranged between the bars 7, and the other eye of the bolt is adapted for connection with the hook of one pulley of a block and tackle, for instance. Since the aggregate length of the pairs of bars 7 and 8 is greater than that of the bars 5, it will be evident that when traction is made on the double eye bolt 11 the bars 7 and 8 moving into alinement will cause the dogs to swing toward each other at the spurred end. Coil springs 12 are arranged between the outer ends of the bars 5, 7 and 8, a spring being arranged between the bars 5 at each end thereof and the adjacent end of the adjacent pair of plates 7 or 8 as the case may be. These springs normally tend to straighten the pairs of bars 7 and 8, and to swing the dogs into gripping position. The farther the bars 7 and 8 are from alinement the more widely apart will be the spurs of the dogs 1 and 2.

Flexible members 13, chains in the present instance, are arranged between the pivotal connection 10 and the centers of the bars 5, and these chains limit the swinging movement of the bars 7 and 8 into a position where they will be in alinement.

In use, when the grapple is to be connected with a joist, for instance, to support a block and tackle, the pivotal connection 10 is moved toward the bars 5 to open the jaws of the dogs. The said jaws are now placed on each side of the joist, and the pivotal connection is released. The springs 12 tend to straighten the bars 7 and 8 and to cause the dogs to grip the joists. The greater the traction on the eye bolt 11 the more tightly will the jaws of the dogs be forced into contact with the joist. For gripping smaller objects, the bolts 6 and 9 may be moved inwardly, while for gripping larger objects they may be moved outwardly. The grapple may also be used for engaging logs, for instance, to transport the same, in which case the position would be reverse from that shown in Fig. 1. The operation, however, will be the same.

I claim:

A grapple comprising a pair of dogs having gripping spurs at one end, a bar arranged transversely of the dogs intermediate the ends thereof and pivotally connected to the dogs nears its ends, a bar pivoted intermediate its ends to each dog at the end remote from the spur, said bars being pivotally connected at their adjacent ends, traction mechanism connected with the pivatal connection, spring arranged between the outer ends of the last named bars and the ends of the first named bar and normally tending to aline said last named bars, and a flexible connection between the connected ends of said last named bars and the first named bar to limit the movement of the said bars at their pivotal connection away from the first named bar and to distribute the pull of the traction mechanism upon the said bars.

CHARLES EIRNEST DREILING.

Witnesses:
CHAS. M. MEADE,
WILLIAM CRAWFORD.

Copies of this patent may be obtained for five cents each, by addressing the "Commissioner of Patents, Washington, D. C."